United States Patent [19]

Brothers

[11] 3,961,766

[45] June 8, 1976

[54] CONTAINER HOLDING ARRANGEMENT

[76] Inventor: Alvin O. Brothers, 2001 E. Franklin St., Evansville, Ind. 47711

[22] Filed: Aug. 21, 1975

[21] Appl. No.: 606,514

[52] U.S. Cl. .............................................. 248/210

[51] Int. Cl.² ..................... F16M 13/00; B44D 3/14

[58] Field of Search ............ 248/210, 211, 238, 311

[56] References Cited

UNITED STATES PATENTS

| | | | |
|---|---|---|---|
| 2,056,527 | 10/1936 | Kummer | 248/210 |
| 3,131,900 | 5/1964 | Anderson et al. | 248/311 R X |
| 3,309,053 | 3/1967 | Baker | 248/210 |

*Primary Examiner*—J. Franklin Foss

*Attorney, Agent, or Firm*—Jenkins, Hanley & Coffey

[57] ABSTRACT

A container holding apparatus for mounting either on a slotted horizontal work surface, such as a paint shelf of a step ladder, or outwardly from an upwardly extending support, such as a leg of a ladder, including a container-receiving assembly having a plurality of vertically extending members joined by a horizontally extending member. A first bracket is attached to the horizontal member and a first clamp member is adapted for fastening to the first bracket by a bolt received through the slotted horizontal work surface for clamping the container-receiving assembly to the work surface. A second multi-purpose bracket is removably attached to the horizontally extending member to support and stabilize the container-receiving assembly in an upright orientation on the work surface. For mounting the container-receiving assembly outwardly from the upwardly extending support, the multi-purpose bracket may be removed from the horizontally extending member and attached to one of the vertically extending members. A second clamp member is then attached to the multi-purpose member with the support therebetween to clamp the container-receiving assembly thereto.

8 Claims, 4 Drawing Figures

CONTAINER HOLDING ARRANGEMENT

BACKGROUND OF THE INVENTION

This invention relates to container holding assemblies and particularly to assemblies for situating paint containers at various positions on a step ladder.

A commercial or non-commercial painter who uses a step ladder to reach an area which is to be painted frequently encounters difficulty in situating a paint container so that it may be easily reached. For example, the painter may find it convenient to have the container mounted outwardly from the generally upwardly extending supporting legs of the ladder, or he may find it more advantageous to locate the container on the outwardly swinging paint shelf with which such a step ladder is frequently provided.

Many types of apparatus exist for holding a paint container upon a step ladder or other type of ladder in these aforementioned orientations. For example, see U.S. Pat. Nos. 2,683,553 issued to Ariss, 3,319,916 issued to Malicoat, 3,313,506 issued to Bauchard, and 2,911,133 issued to Ruggieri, and British Patent Specification No. 856,655 issued to Hunt.

The devices of many of these references, however, suffer certain shortcomings. For example, in certain situations, it may be desirable to prop the top tread of the step ladder against a wall to support the ladder on two legs rather than unfold the step ladder. With the prior art disclosures, however, the paint shelf of the step ladder would interfere with such positioning. It may further be desirable in such a situation to tilt the paint container to recover more paint from it. This invention is directed to achieve such objectives as providing a container holding arrangement which will allow paint to be held in these positions as well as providing an improved arrangement for holding a paint container on the shelf of a step ladder.

In accordance with the invention, a container-receiving arrangement is adapted for clamping to either an upwardly extending support or an apertured horizontal work surface of a ladder. The arrangement comprises container-receiving means having at least first vertical and horizontal members, first bracket means attached to the first horizontal member and adapted for positioning the container-receiving means on the first horizontal member, and first clamp means adapted for attachment through the aperture to the first bracket means for clamping the horizontal work surface of the ladder between the first bracket means and the first clamp means thereby removably clamping the container-receiving arrangement to the horizontal work surface. Second bracket means are adapted for removable, selective attachment to either the first horizontal or vertical member when the container-receiving means is clamped to the horizontal work surface or to the support respectively. The second bracket means provides a supporting base when attached to the horizontal member and the container-receiving arrangement is clamped to the horizontal work surface. Second clamp means is provided and is adapted for removable attachment to the second bracket means for removably clamping the container-receiving means to the upwardly extending support of the ladder when the second bracket means is attached to the vertical member and the second clamp means is attached to the second bracket means with the support therebetween.

The invention may best be understood by referring to the following description and accompanying drawings of which:

Figure 1:
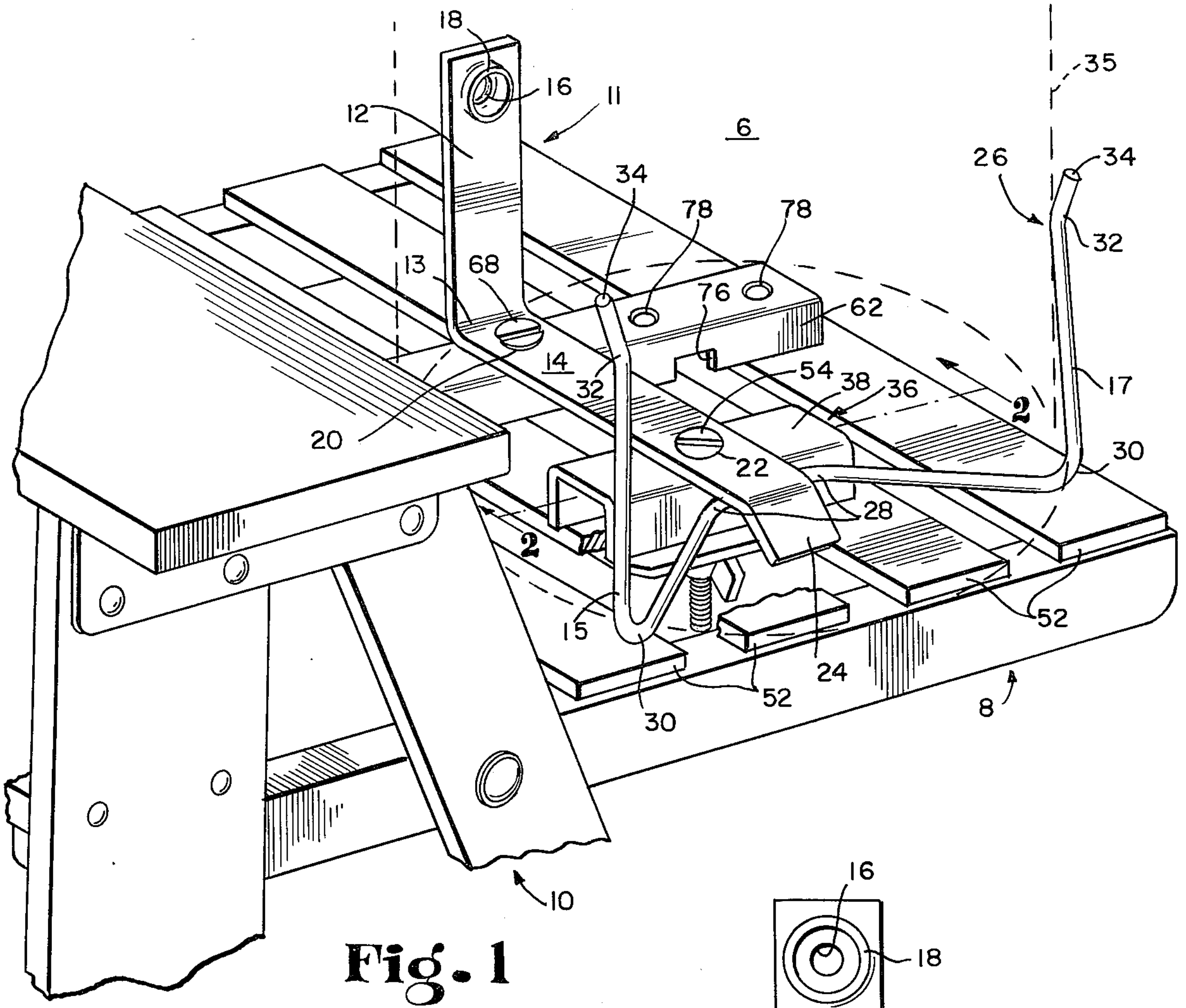
FIG. 1 is a fragmentary, partly sectioned perspective view of the container-receiving arrangement attached to a horizontal work surface of a step ladder.
Figure 2:
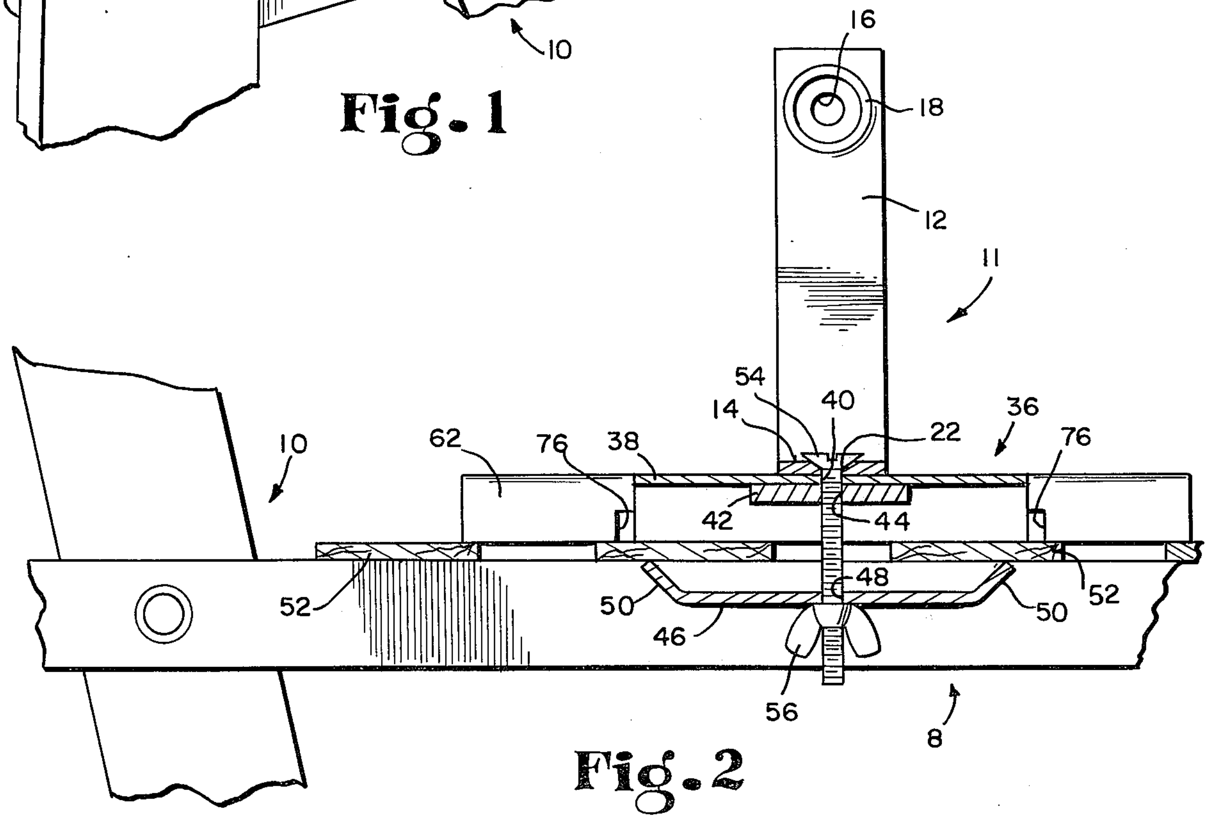
FIG. 2 is a fragmentary and enlarged sectional view taken from section line 2—2 of FIG. 1.

In a preferred embodiment of the container-receiving arrangement adapted for attachment to either a slotted paint shelf 8 or an upwardly extending leg 9 of a step ladder 10, the container-receiving assembly comprises an L-shaped member 11 made of strip or sheet metal stock. L-shaped member 11 comprises a first vertically extending portion 12 bent at a bend 13 to form a horizontally extending portion 14. First vertically extending portion 12 has an attachment hole 16 through the upper extent thereof, the hole being surrounded by a built-up ridge 18. Horizontally extending portion 14 has one hole 20 near bend 13 and a hole 22 remote from bend 13. The distal end of the horizontally extending portion 14 is bent slightly downwardly at 24 to provide a surface against which a user may position a hand or finger to aid in removing a paint container from the container-receiving assembly.

Two additional vertically extending members 15, 17 and supported by horizontal member 14. Members 15,17 are formed by attaching, by welding or other suitable means, a piece of rod-shaped material to the under side of horizontally extending portion 14 at bend 24. The piece of rod-shaped stock 26 is bent first at bends 28 outwardly and then upwardly at bends 30. Two slightly inward bends 32 are placed in rod stock 26 near the distal ends 34 of the upwardly projecting portions thereof. The slight inward bends 32 form contact points along with ridge 18, said points being approximately 120° apart in a plane parallel to the horizontally extending member 14. A paint container 35 is slidably received among these contact points and securely held into assembly 6 by spring tension asserted on the side walls of container 35 by vertical members 15,12,17.

First attachment means 36 for attaching the container-receiving assembly to horizontal work surface 8 of step ladder 10 comprises a length of channel 38 of generally C-shaped cross section with a hole 40 therethrough and a flat metal piece 42 attached to the underside of said channel. Flat piece 42 is provided with a threaded hole 44 which is aligned with hole 40.

A first clamp member 46, which is made of strip or sheet metal stock, has a hole 48 centrally disposed along the length thereof, and upturned ends 50. Clamp member 46 is desirably sufficiently narrow to fit through the slots between slats 52 of paint shelf 8 of the step ladder. A bolt 54 is passed through mating holes 22,40,44,48 and a wing nut 56 is threaded on the end of bolt 54 to clamp slats 52 of shelf 8 between members 38 and 46. If shelf 8 is not slotted, a hole can be drilled through the paint shelf to accommodate bolt 54 in order to clamp members 46 and 38 together to hold container receiving assembly 6 on the horizontal work surface 8 of the step ladder. Of course, the assembly can be positioned on any other horizontal work surface of the ladder, such as the top step, by drilling a hole therethrough so that bolt 54 may be passed through the surface to clamp the assembly to it.

Support bracket means comprises a multi-purpose member 62 which is fashioned from a length of channel, said channel having a generally C-shaped cross section. Multi-purpose member 62 has a hole 64 centrally located along its length. Hole 64 is adapted for receiving a bolt 68 therethrough. Multi-purpose member 62 also has a flat 70 with a threaded hole 72 therethrough which is matingly positioned under hole 64. Flat 70 is attached to the bottom side of member 62 for removably attaching member 62 to horizontal member 14 of the container-receiving assembly. When member 62 is attached in this position, it serves to steady the container-receiving assembly when the assembly is attached to paint shelf 8 for holding paint container 35 thereon. Flat 70 may be attached to the underside of channel 62 by rivets 74 or other suitable fastening means.

Figure 3:
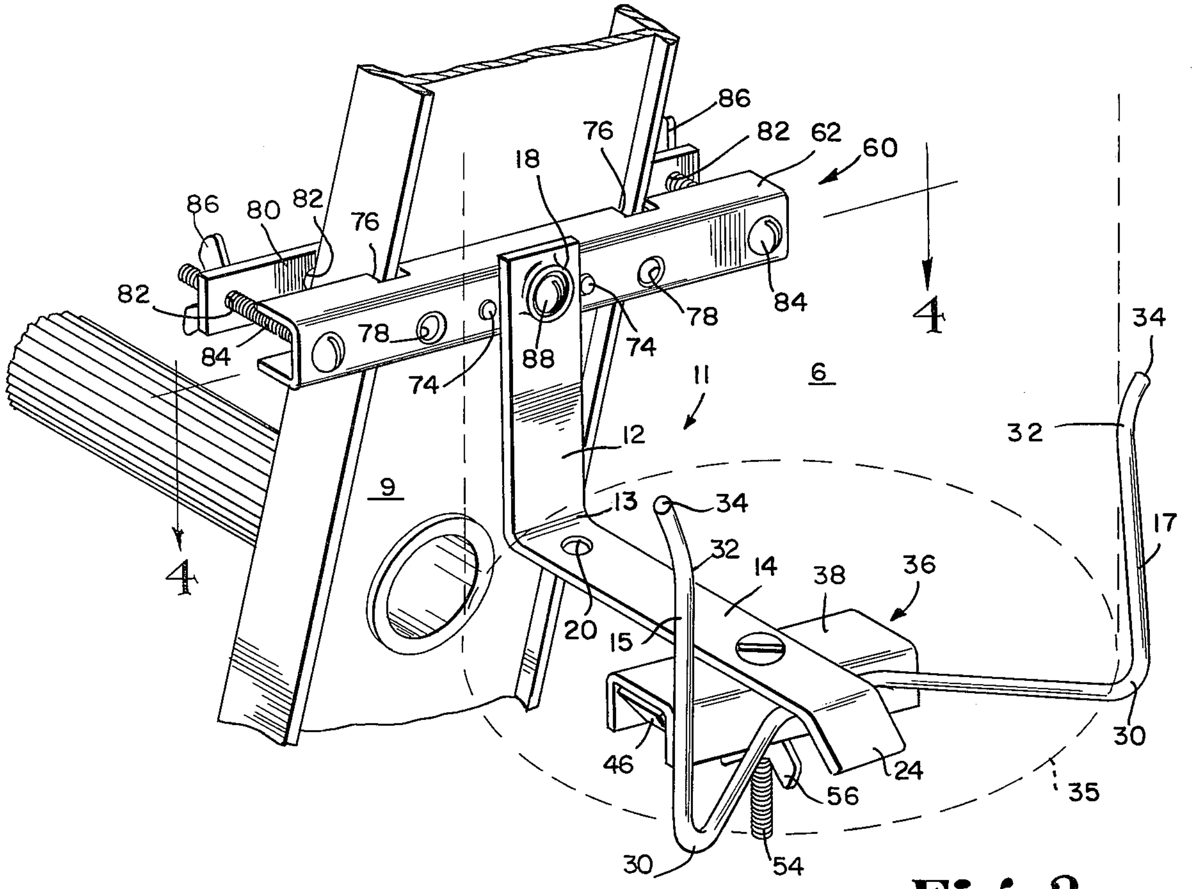
FIG. 3 is a fragmentary perspective view of the container-receiving arrangement attached to an upwardly extending supporting leg of said step ladder; and, FIG. 4 is a sectional view taken from section line 4—4 of FIG. 3.
Figure 4:
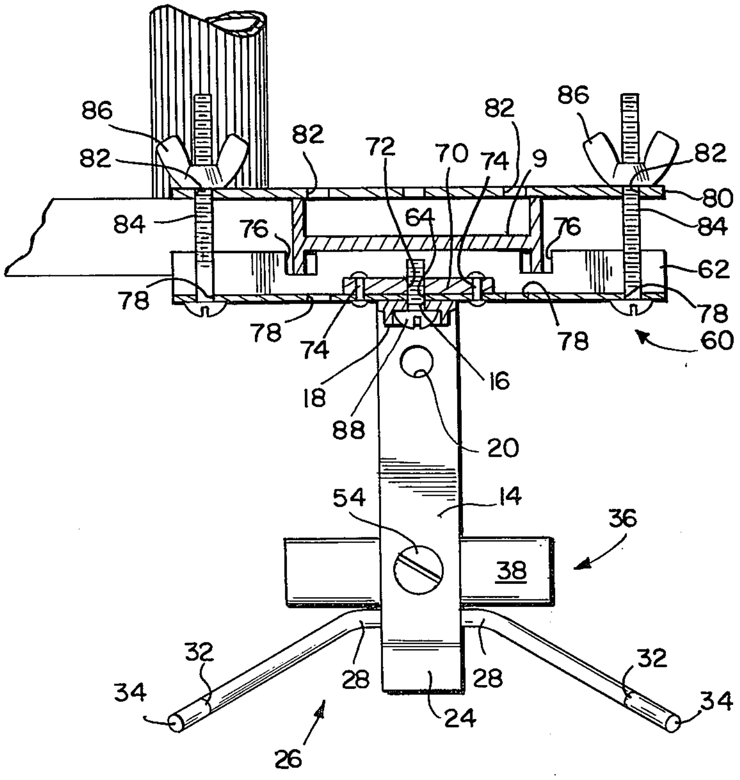

Multi-purpose member 62 has, along the downwardly projecting side edges thereof, a plurality of notches 76. Along the upper surface of member 62 and outwardly from central hole 64 toward the ends thereof are a plurality of spaced apart holes 78. As shown in FIGS. 3–4, to attach the container-receiving assembly 6 to an upwardly extending leg 9 of step ladder 10 for supporting paint container 35 outwardly from leg 9, an additional clamp member 80 is provided. Clamp member 80 comprises a length of strip or sheet metal stock having a plurality of spaced apart holes 82 therethrough. Holes 82 are adapted for receiving a plurality of bolts 84, said bolts having tightening wing nuts 86 threaded thereon.

To convert container-receiving assembly 6 from a horizontally supported assembly to a vertically supported one, bolt 68 is removed allowing the central hole 64 of multi-purpose member 62 to be aligned with attachment hole 16 of vertical portion 12 and attached thereto by a bolt 88. Member 62 is then placed on the outside of leg 9 and clamp member 80 is attached thereto by aligning holes 78,82 and passing bolts 84 therethrough. Members 62,80 can be clamped together with leg 9 therebetween by tightening wing nuts 86.

Notches 76 along the side edges of member 62 allow member 62 to accommodate illustrative legs 9 which have a generally I-shaped cross section such as are frequently found on step ladders. Holes 78,82 are spaced to accommodate various standard width legs 9 therebetween.

As shown in FIG. 3, when container-receiving assembly 6 is attached to the leg 9 of step ladder 10, clamp member 46 may be stored under channel 38 by tightening wing nut 56. The adaptability of the container-receiving arrangement for attachment to leg 9 allows the ladder to be propped against the wall on two legs without interference from a projecting shelf 8. Since paint container 35 is held outwardly from the leg 9 rather than on shelf 8, the shelf may be folded into a storage position. Further, this type of container-receiving assembly can be used with other types of ladders besides step ladders, such as extension ladders, by attaching the assembly outwardly from a leg of the ladder.

Additionally, when the container-receiving assembly is attached to leg 9 the assembly may be tilted by pivoting it about bolt 88. Thus container 35 may be tilted while in the container-receiving assembly more fully to recover its contents.

I claim:

1. A container-receiving arrangement adapted for clamping to an upwardly extending support of a ladder and to an apertured horizontal work surface of a ladder, said arrangement comprising container-receiving means having at least first vertical and horizontal members, first bracket means for attachment to said first horizontal member, first clamp means for attachment through said work surface aperture to said first bracket means for clamping said horizontal work surface between said first bracket means and said first clamp means for removably clamping said container-receiving means to said horizontal work surface, second bracket means adapted for selective attachment to either said first vertical or horizontal member when said container-receiving means is clamped to said upwardly extending support or said horizontal work surface respectively, and second clamp means for removable attachment to said second bracket means for removably clamping said container receiving means to said upwardly extending support of said ladder when said second bracket means is attached to said vertical member and said second clamp means is attached to said second bracket means with said support therebetween.

2. A container-receiving arrangement adapted for attachment to either an upwardly extending member or a slotted horizontal work surface of a ladder, said arrangement comprising container-receiving means having at least first vertical and horizontal members, first clamp means attached to said first horizontal member for clamping said container-receiving means removably and securely upon said slotted horizontal surface, first support means removably attached to said first horizontal member for steadying said container-receiving means upon said horizontal surface, and second clamp means, said first support means adapted for being attached to said first vertical member and for being attached to said second clamp means for removably and securely clamping said upwardly extending member of said ladder between said support means and said second clamp means for clamping said container-receiving means to said upwardly extending member.

3. A container holding arrangement for selectively holding a container upon either a horizontal work surface of a ladder or outwardly from an upwardly extending surface thereof comprising a container-receiving assembly having a plurality of vertically upwardly extending members joined together by at least one horizontally extending member for holding said container therebetween, first attachment means connected to said horizontally extending member for attaching said container receiving assembly in upstanding orientation on said horizontal work surface, second attachment means connected to one of said upwardly extending members for attaching said container receiving assembly in upstanding orientation from said upwardly extending surface, said second attachment means including a support bracket alternatively attachable to said horizontal member to serve as an additional stabilizing support for said receiving assembly.

4. A container holding arrangement according to claim 3 wherein said container has a generally cylindrical peripheral sidewall and said plurality of vertically upwardly extending members comprise three generally vertically extending metal members providing contact points thereon disposed at approximately 120° intervals from one another for contacting said peripheral sidewall at approximately 120° intervals about said cylindrical periphery thereof in springing engagement for firmly gripping and holding said container.

5. A container holding arrangement for selectively holding a container upon either a horizontal work surface of a ladder or outwardly from an upwardly extending surface thereof comprising a container-receiving assembly having a plurality of vertically upwardly extending members joined together by at least one horizontally extending member for holding said container therebetween, first attachment means connected to said horizontally extending member for attaching said container receiving assembly in upstanding orientation on said horizontal work surface, second attachment means connected to one of said upwardly extending members for attaching said container receiving assembly in upstanding orientation from said upwardly extending surface, said second attachment means including a support bracket alternatively attachable to said horizontal member to serve as an additional stabilizing support for said receiving assembly, said support bracket comprising a member having a generally C-shaped cross section, the edges of said C-shaped cross section member being provided with a plurality of notches for fitting engagement of said edges against said upwardly extending surface of said ladder when said upwardly extending surface comprises a ladder leg having a generally I-shaped cross section, said plurality of notches for accommodating the protrusions along the edges of said I-shaped cross section leg.

6. A container holding arrangement according to claim 3 wherein said support bracket is adapted for adjustable pivotal attachment to said one of said plurality of vertically upwardly extending members of said container-receiving assembly for tilting orientation of said container-receiving assembly when said container-receiving assembly is attached outwardly from said upwardly extending surface of said ladder.

7. An arrangement for mounting a container upon an apertured, upwardly facing platform of a ladder and upon an upwardly extending support of a ladder, said arrangement comprising a container receiving means providing a horizontal member and a plurality of upwardly extending members for receiving a container therebetween, first bracket means attached to said horizontal member and resting upon said platform, first clamp means for removably attaching said first bracket means to said platform, said first clamp means penetrating upwardly through the aperture of said platform to hold said first bracket means downwardly thereon, second bracket means alternatively attached to one of said vertical members and said horizontal member when said receiving means is attached to the upwardly extending support and said platform, respectively, and second clamp means for removably attaching said second bracket means to said support when said second bracket means is attached to said one of said vertical members, said second bracket means, when attached to said horizontal member, also resting upon said platform.

8. In a container-receiving assembly for holding a generally cylindrical container, said assembly comprising a plurality of vertically upwardly extending members joined together by a horizontally extending member for holding said container therebetween, a first one of said plurality of vertically upwardly extending members and said horizontally extending member being formed from an L-shaped piece of material having an approximately right-angle bend at their junction and each of said first vertically extending member and said horizontally extending member has an end remote from said bend, the improvement wherein said end of said horizontally extending member remote from said right-angle bend includes an oblique downward bend providing a portion for aiding in removal of said container from said container-receiving assembly, and said end of said first vertically extending member remote from said bend is provided with a ridge, said ridge facing inwardly toward the remaining vertically extending legs of said container-receiving assembly for providing a contact point on said first vertically extending member against which said container is urged by the remaining vertically extending members of said container-receiving assembly.

* * * * *